United States Patent
Li et al.

(10) Patent No.: US 10,788,706 B2
(45) Date of Patent: Sep. 29, 2020

(54) BACKLIGHT MODULE AND DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventors: Ting Li, Beijing (CN); Qilin Li, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/413,751

(22) Filed: May 16, 2019

(65) Prior Publication Data

US 2020/0103706 A1     Apr. 2, 2020

(30) Foreign Application Priority Data

Sep. 29, 2018  (CN) ..................... 2018 2 1598711 U

(51) Int. Cl.
 - *F21V 7/04*     (2006.01)
 - *G02F 1/13357*  (2006.01)
 - *F21V 8/00*     (2006.01)

(52) U.S. Cl.
 CPC ..... *G02F 1/133606* (2013.01); *G02B 6/0065* (2013.01)

(58) Field of Classification Search
 None
 See application file for complete search history.

(56) References Cited

U.S. PATENT DOCUMENTS

| | | | |
|---|---|---|---|
| 7,192,174 B2 * | 3/2007 | Myoung | B24C 1/06 362/561 |
| 9,933,557 B2 * | 4/2018 | Zeng | G02B 6/0055 |
| 2018/0157097 A1 * | 6/2018 | Wang | G02F 1/133308 |
| 2018/0157115 A1 * | 6/2018 | Hineno | G02B 6/0025 |

* cited by examiner

*Primary Examiner* — Vip Patel
(74) *Attorney, Agent, or Firm* — Brooks Kushman P.C.

(57) ABSTRACT

The present disclosure relates to a backlight module including a light guide plate, and further an integrally-formed frame covering the light guide plate. The integrally-formed frame including an accommodating cavity for accommodating the light guide plate. The accommodating cavity is formed to be surrounded by a top plate located at a light-emitting surface of the light guide plate, a side plate located at a side of the light guide plate, and a bottom plate located at a bottom surface of the light guide plate opposite to the light-emitting surface. The present disclosure also relates to a display device.

18 Claims, 5 Drawing Sheets

BACKLIGHT MODULE AND DISPLAY DEVICE

CROSS-REFERENCE TO RELATED APPLICATION

The present application claims priority to Chinese Patent application No. 201821598711.3 filed on Sep. 29, 2018, which is incorporated herein by reference in its entirety.

TECHNICAL FIELD

The present disclosure relates to the field of product manufacturing technology, in particular to a backlight module and a display device.

BACKGROUND

With the maturity of liquid crystal display technology, the appearance-integrated display has been sought after by more and more people because of its thinness and lightness. A display in related art generally includes a back plate and a middle case which are split-connected. Due to the presence of the middle case, debris generated during the middle case is clamped to the back plate may cause products to be defective.

SUMMARY

The present disclosure provides a backlight module, including a light guide plate, and further including an integrally-formed frame covering the light guide plate. The integrally-formed frame includes an accommodating cavity for accommodating the light guide plate. The accommodating cavity is formed to be surrounded by a top plate located at a light-emitting surface of the light guide plate, a side plate located at a side surface of the light guide plate, and a bottom plate located at a bottom surface of the light guide plate opposite to the light-emitting surface.

Optionally, the integrally-formed frame includes a bendable section, and the top plate and/or at least a portion of the side plate and/or at least a portion of the bottom plate are bendable about the bendable section to open and close the accommodating cavity.

Optionally, the bendable section is located at a joint between the top plate and the side plate, or the bendable section is located on the side plate, or the bendable section is located on the bottom plate.

Optionally, the bendable section includes a separable portion adjacent to the light guide plate and an inseparable portion far away from the light guide plate. The separable portion and the inseparable portion are arranged in a direction along a thickness of the integrally-formed frame.

Optionally, the separable portion includes a first sub-portion and a second sub-portion, the first sub-portion and the second sub-portion are formed to be divided by a separating line. The separating line is along a direction from a first position of a surface of the bendable section adjacent to the light guide plate to a surface of the bendable section facing away from the light guide plate.

Optionally, a protrusion extending toward the second sub-portion is arranged on a surface of the first sub-portion adjacent to the second sub-portion, a groove that cooperates with the protrusion is arranged on a surface of the second sub-portion adjacent to the first sub-portion Optionally, the protrusion has a T-shaped cross section, and the protrusion includes a first connecting portion adjacent to the second sub-portion and a second connecting portion far away from the second sub-portion, the first connecting portion has a trapezoid cross section, and an area of a surface of the first connecting portion adjacent to the second sub-portion is smaller than an area of a surface of the first connecting portion far away from the second sub-portion.

Optionally, a first snapping part is arranged on a surface of the first sub-portion facing away from the light guide plate, and a second snapping part for snapping to the first snapping part is arranged on a surface of the second sub-portion facing away from the light guide plate.

Optionally, the first snapping part is a columnar structure, and the second snapping part includes a hook that is enabled to snap to the columnar structure.

Optionally, the integrally-formed frame is integrally injection molded.

Optionally, the integrally-formed frame is made of plastic, and a hardness value of the integrally-formed frame is within a first predetermined range so that the integrally-formed frame can support the light guide plate and the display panel.

Optionally, a material of the integrally-formed frame includes at least one of an ABS and a PC.

Optionally, an outer surface of the integrally-formed frame is provided with a pattern formed by a texturing process.

The present disclosure also provides a display device including a display panel and the backlight module as described above.

BRIEF DESCRIPTION OF THE DRAWINGS

In order to more clearly illustrate the technical solutions of the embodiments of the present disclosure, the drawings to be used in the description of the embodiments of the present disclosure will be briefly described below. It is obvious that the drawings in the following description are only some embodiments of the present disclosure. Other drawings may also be obtained from those skilled in the art without any inventive work.

DETAILED DESCRIPTION

In order to make the objects, technical solutions and advantages of the embodiments of the present disclosure clearer, the technical solutions of the embodiments of the present disclosure will be clearly and completely described below in conjunction with the drawings of the embodiments of the present disclosure. It is apparent that the described embodiments are part of the embodiments of the present disclosure, and not all of the embodiments. All other embodiments obtained by those skilled in the art based on the described embodiments of the present disclosure are within the scope of the disclosure.

Figure 1:
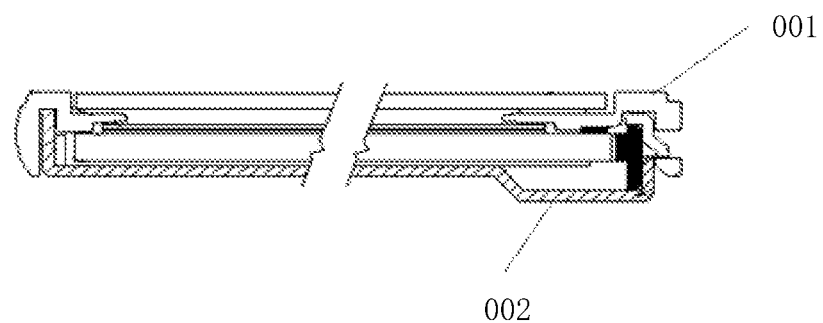
FIG. 1 is a schematic structural view of a backlight module in the related art.

As shown in FIG. 1, a backlight module in the related art generally includes a frame 002 and a back plate 001. The frame 002 and the back plate 001 are connected by a clamping manner, and the debris generated during the frame 002 is clamped to the back plate 001 may cause products to be defective. And referring to FIG. 1, it is apparent that the frame 002 and the back plate 001 partially overlap at a joint, which limits a thickness of the backlight module.

In view of the above problem, the present embodiment provides a backlight module. As shown in FIGS. 2-12, the backlight module includes a light guide plate 202, and further includes an integrally-formed frame 205 covering the light guide plate 202. The integrally-formed frame 205 includes an accommodating cavity for accommodating the light guide plate 202. The accommodating cavity is formed to be surrounded by a top plate 2052 located at the light-emitting surface of the light guide plate 202, a side plate 2053 located at a side of the light guide plate 202, and a bottom plate 2054 of the bottom surface of the light guide plate 202 opposite to the light-emitting surface.

Figure 2:
FIG. 2 is a structural schematic view of a backlight module in an embodiment of the present disclosure.
Figure 3:
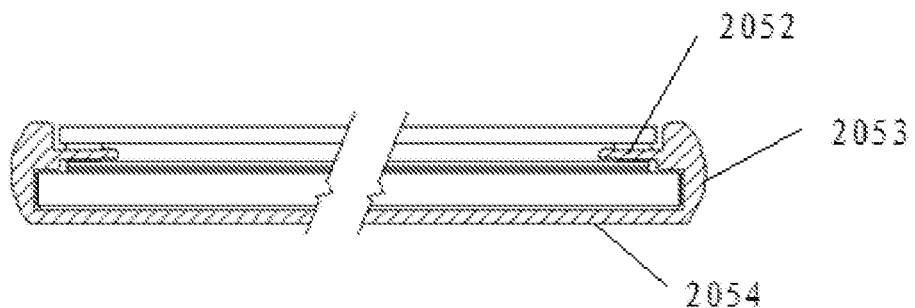
FIG. 3 is a structural schematic view of a backlight module according to an embodiment of the present disclosure.

As shown in FIGS. 2 and 3, the integrally-formed frame 205 has no clamping structure, and the light guide plate 202 is accommodated in the accommodating cavity of the integrally-formed frame 205, and an optical film 201 is arranged on the light guide plate 202. A reflective sheet 203 is arranged between the light guide plate 202 and the bottom plate 2054. The light bar 204 is located at a side of the light guide plate 202. The display panel 207 is supported on the top plate 2052. A foam tape 206 (an adhesive layer may also be used here) is arranged between the top plate 2052 and the display panel 207 to fix the display panel 207. A structure of the integrally-formed frame according to the present embodiment can reduce the defects of the backlight module due to the debris generated during clamping. And compared with the current backlight module structure, the structure of the integrally-formed frame 205 eliminates a middle case and a back plate, so that a weight of the backlight module is greatly reduced and a thickness of the backlight module is reduced. A thickness of the display module including the integrally-formed frame 205 can reaches a minimum thickness of 5.9 mm. A process assembling the middle case and the back plate can be eliminated.

Figure 4:
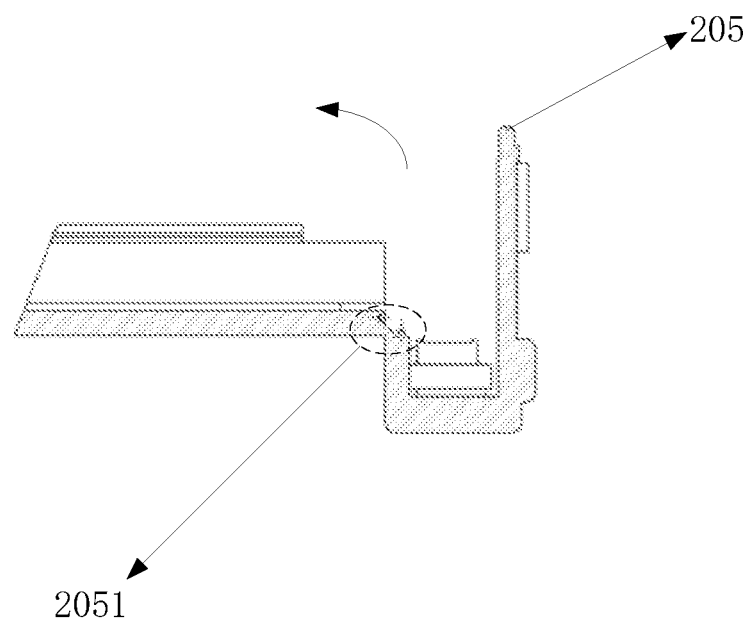
FIG. 4 is an enlarged structural schematic view of a portion of a backlight module according to an embodiment of the present disclosure.
Figure 5:
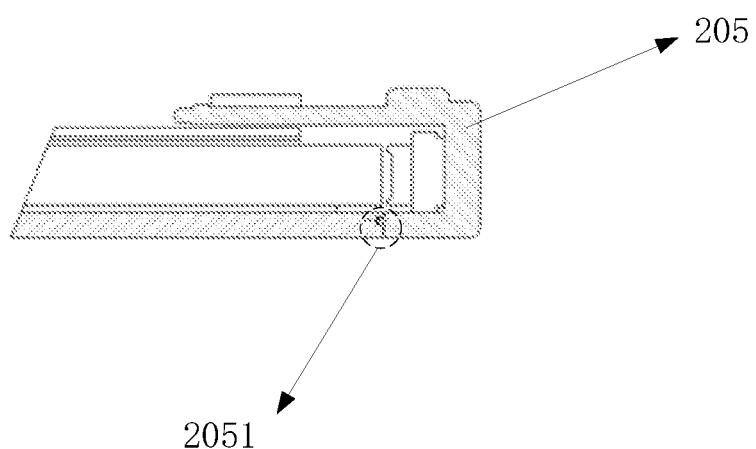
FIG. 5 is an enlarged structural schematic view of a portion of a backlight module according to an embodiment of the present disclosure.

The integrally-formed frame 205 may have a plurality of specific structural forms. Optionally, in order to facilitate assembly, in the present embodiment, the integrally-formed frame 205 includes a bendable section 2051, the top plate 2052 and/or at least a portion of the side plate 2053 and/or at least a portion of the bottom plate 2054 which can be bent around the bendable section 2051 to open and close the accommodating cavity. FIG. 4 shows an open state of the accommodating cavity, and FIG. 5 shows a state in which the accommodating cavity is closed along a direction of the arrow in FIG. 4.

As shown in FIG. 2 and FIG. 3, due to the top plate 2052, an area of an opening of the accommodating cavity is smaller than an area of the light guide plate 202. And in the case that the light bar 204 is located on the side of the light guide plate 202, the installation of the light bar 204 also has a certain difficulty. However, a design of the bendable section 2051 can solve the problem, so that the accommodating cavity formed to be surrounded by the top plate 2052, the side plate 2053 and the bottom plate 2054 can be converted between the open state and a closed state. In the case that the accommodating cavity is in the open state, assembling the optical film, such as the light guide plate 202, to the integrally-formed frame 205 is facilitated, and after the assembly is completed, the integrally-formed frame 205 is converted from the open state to the closed state to support to fix the optical film such as the light guide plate 202.

Figure 6:
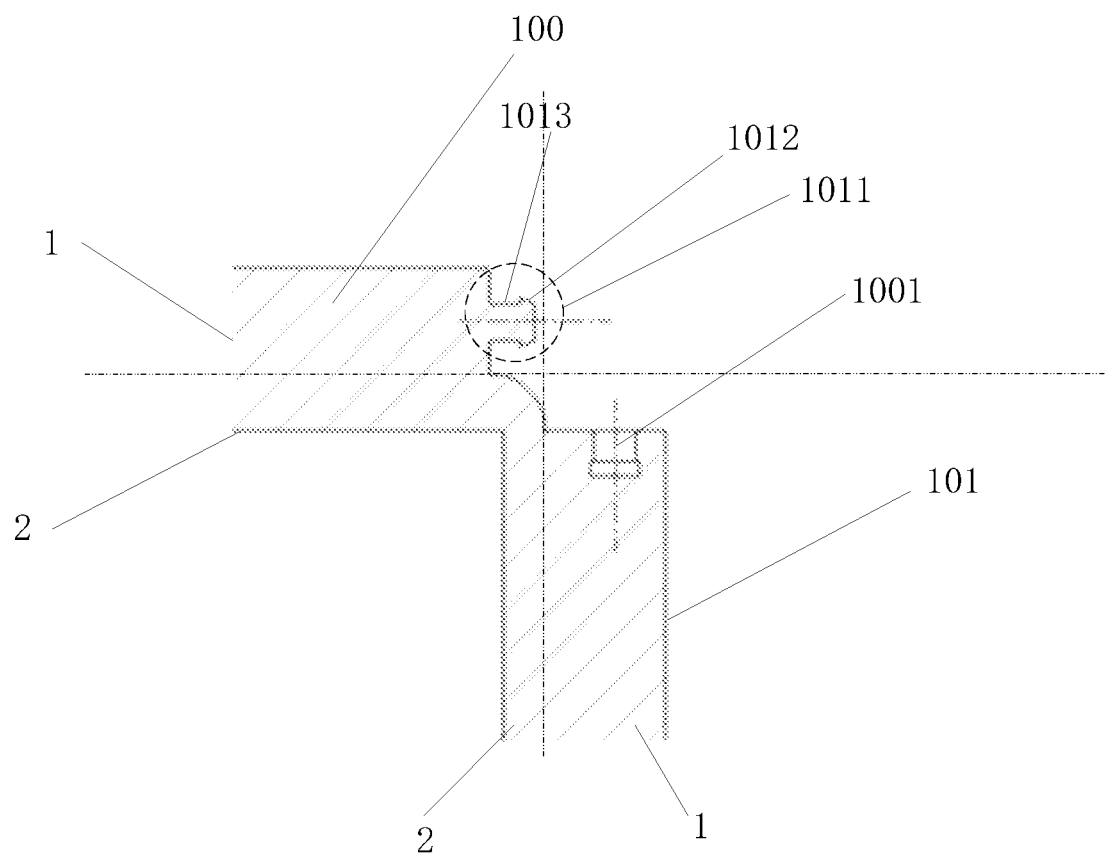
FIG. 6 is a structural schematic view showing a structure of a bendable section in an embodiment of the present disclosure.

A specific position of the bendable section 2051 can be arranged according to actual requirements. For example, the bendable section 2051 is located at a joint between the top plate 2052 and the side plate 2053, or the bendable section 2051 on the side plate 2053, or the bendable section 2051 is located on the bottom plate 2054. Optionally, as shown in FIG. 6, in the present embodiment, the bendable section 2051 is arranged on the bottom plate 2054, but is not limited thereto.

A specific structure of the bendable section 2051 can be various. As shown in FIG. 6, in an embodiment, the bendable section 2051 includes a separable portion 1 adjacent to the light guide plate 202 and an inseparable portion 2 far away from the light guide plate 202 along the thickness direction of the integrally-formed frame 205. FIG. 6 shows the open state of the integrally-formed frame 205. The integrally-formed frame 205 is divided into a separable portion 1 and an inseparable portion 2 in the bendable section 2051(the separable portion 1 and the inseparable portion 2 are located on both sides of dotted lines). The integrally-formed frame 205 further serves as an appearance part. The inseparable portion 2 ensures the esthetic effect of the appearance of the integrally-formed frame 205, and the separable portion 1 realizes opening and closing of the accommodating chamber.

The bendable section 2051 can achieve a bendable performance due to the toughness of the integrally-formed frame 205, but since the integrally-formed frame 205 is used for supporting the optical film, such as the light guide plate 202, and the display panel, the integrally-formed frame 205 needs to possess a certain strength, so that the toughness of the integrally-formed frame 205 is limited. In an embodiment of the present disclosure, the bendable section 2051 adopts a thin design, that is, the separable portion 1 of the bendable section 2051 is formed by an opening on the side of the integrally-formed frame 205 adjacent to the light guide plate 202, so that the bendable performance of the bendable section 2051 can be ensured, and a support strength of overall integrally-formed frame 205 can also be ensured.

The separable portion 1 of the bendable section 2051 is formed by an opening of the integrally-formed frame 205 adjacent to the light guide plate 202. In this situation, the support strength at the bendable section 2051 is weak, which easily leads to breakage and the like. In another embodiment, as shown in FIG. 6, the separable portion 1 includes a first sub-portion 100 and a second sub-portion 101, and the first sub-portion 100 and the second sub-portions 101 are formed to be divided by a separating line. The separating line is along a direction from a first position of a surface of the bendable section 2051 adjacent to the light guide plate 202 to a surface of the bendable section 2051 facing away from the light guide plate 202. Thus, the bendable performance of the bendable section 2051 can be ensured, and the support strength of the bendable section 2051 in the closed state of the accommodating cavity can also be ensured.

As shown in FIG. 6, in the present embodiment, in order to ensure connection strength and connection stability between the first sub-portion 100 and the second sub-portion 101 and prevent the integrally-formed frame 205 from being deformed to cause the products to be defective in the case that the accommodating cavity is in the closed state, a protrusion 1011 extending toward the second sub-portion 101 is arranged on a surface of the first sub-portion 100 adjacent to the second sub-portion 101, and a groove 1001 cooperating with the protrusion 1011 is arranged on a surface of the second sub-portion 101 adjacent to the first sub-portion 100.

As shown in FIG. 6, as long as the first sub-portion 100 can be connected to the second sub-portion 101, specific structures of the protrusions 1011 and the groove 1001 may be various. In the present embodiment, the cross section of the protrusion 1011 has a T-shaped structure, and the protrusion 1011 includes a first connecting portion 1012 adjacent to the second sub-portion 101 and a second connecting portion 1013 far away from the second sub-portion 101. The first connecting portion 1012 has a trapezoidal cross section, and an area of a surface of the first connecting portion 1012 adjacent to the second sub-portion 101 is smaller than an area of a surface of the first connecting portion 1012 facing away from the second sub-portion 101.

In this embodiment, the protrusions 1011 and the grooves 1001 are connected by an interference fit, but are not limited thereto.

In order to further ensure the connection stability between the first sub-portion 100 and the second sub-portion 101, in the present embodiment, a first snapping part is arranged on a surface of the first sub-portion 100 facing away from the light guide plate 202, and a second snapping part is arranged on a surface of the second sub-portion 101 facing away from the light guide panel 202 for snapping to the first snapping part.

The first snapping part and the second snapping part can be arranged on any surface except for one surface receiving the light guide plate 202 so as to avoid affecting the assembly of the light guide plate 202. Specific arrangement positions of the first snapping part and the second snapping part can be provided according to actual requirements.

Figure 7:
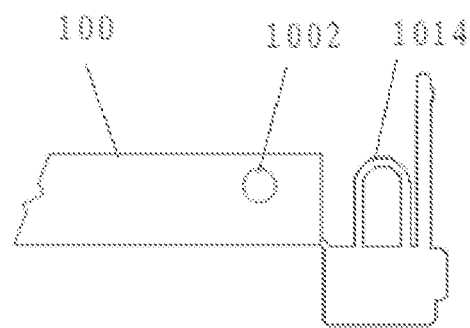
FIG. 7 is a structural schematic view showing a separated state of a first snapping part and a second snapping part in an embodiment of the present disclosure.
Figure 8:
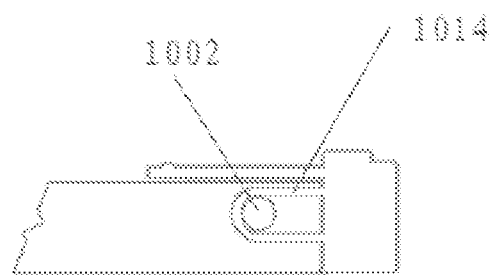
FIG. 8 is a structural schematic view showing a connected state of a first snapping part and a second snapping part in an embodiment of the present disclosure.

As shown in FIGS. 7 and 8, the first snapping part and the second snapping part may have a plurality of specific structures. In this embodiment, the first snapping part is a columnar structure 1002, and the second snapping part includes a hook 1014 that can be snapped to the columnar structure 1002.

The hook 1014 or the columnar structure 1002 has elasticity with a certain degree. When the hook 1014 is snapped to the columnar structure 1002, the hook 1014 or the columnar structure 1002 is deformed to make the hook 1014 engage to the columnar structure 1002.

The specific shape of the hook may be various, for example, a hook shape. In the present embodiment, the hook 1014 has a ring structure to avoid detachment of the column structure 1002.

The first snapping part and the second snapping part may be separately arranged or integrally formed with the integrally-formed frame 205.

Figure 9:
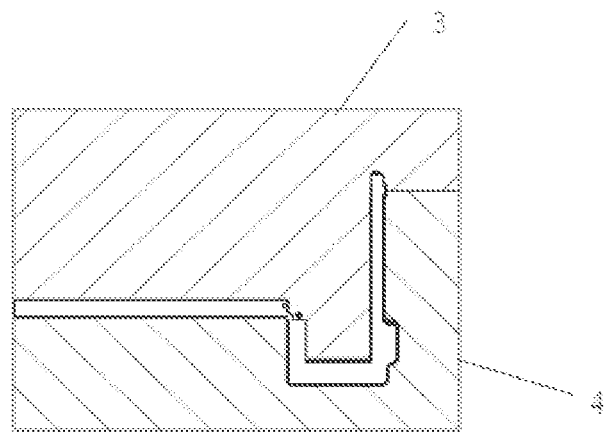
FIG. 9 is a structural diagram showing a portion of a mold of the integrally-formed frame in an embodiment of the present disclosure.
Figure 10:
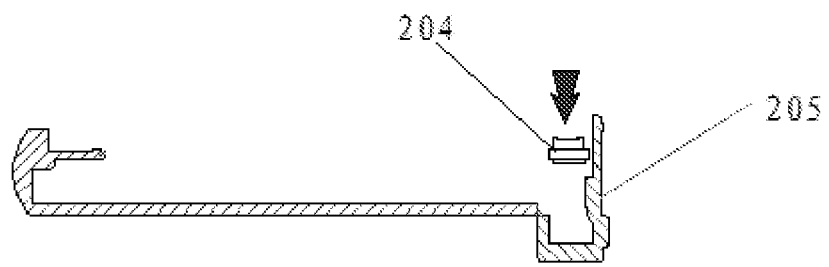
FIG. 10 is a first schematic diagram showing an assembled state of a backlight module in an embodiment of the present disclosure; FIG.
Figure 11:
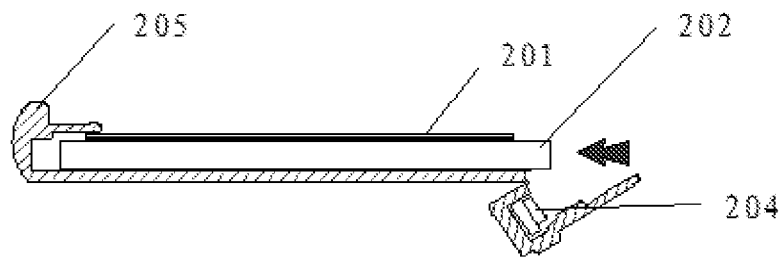
FIG. 11 is a second schematic diagram showing an assembled state of a backlight module in an embodiment of the present disclosure.
Figure 12:
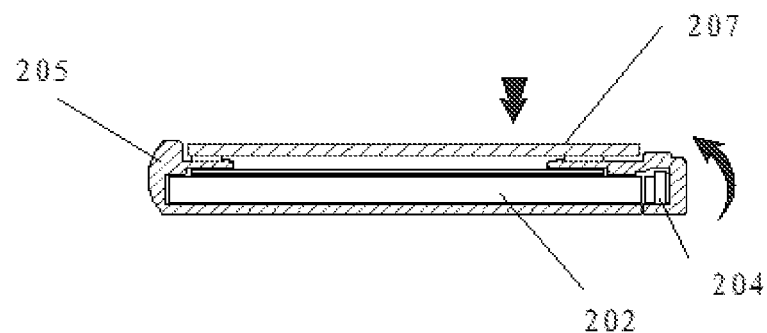
FIG. 12 is a third schematic diagram showing an assembled state of a backlight module in an embodiment of the present disclosure.
Figure 13:
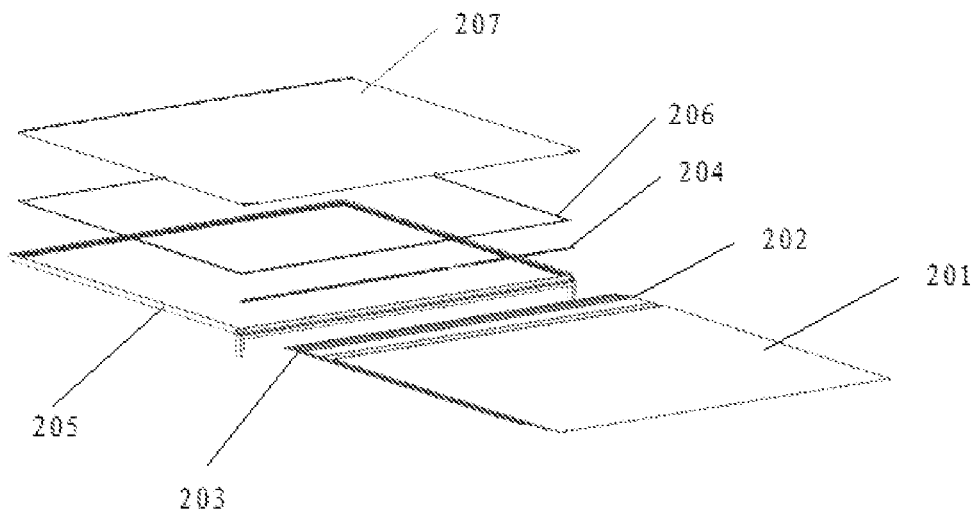
FIG. 13 is an exploded view of the display device in an embodiment of the present disclosure.

In the present embodiment, the integrally-formed frame 205 is integrally injection molded, but not limited thereto. FIG. 9 shows a partial structural schematic diagram of the mold of the integrally-formed frame 205. In order to facilitate manufacturing the structure of the bendable section, the integrally-formed frame is molded in the open state, and the mold of the integrally-formed frame includes a male mold 3 and a female mold 4.

In the present embodiment, the integrally-formed frame 205 is made of plastic, and a hardness value of the integrally-formed frame 205 is within a first predetermined range, so that the integrally-formed frame 205 can support the light guide plate 202 and the display panel.

It should be noted that a specific value of the first predetermined range of the hardness value can be set according to the actual requirements, and may be determined by a desired support strength and a desired toughness of the integrally-formed frame 205.

Optionally, the material of the integrally-formed frame 205 includes ABS and/or PC.

The material of the integrally-formed frame 205 can be selected from PC. In order to ensure the fluidity of the material and easy to mold, the ABS material can be added, that is, the material of the integrally-formed frame 205 is a mixed material of ABS and PC. The ratio of ABS and PC can be set according to actual requirements. Injection molding can be performed using the mold as shown in FIG. 9. And a molding temperature is controlled at 220° C.

In the present embodiment, there is no back plate. The integrally-formed frame 205 is used as a receiving member to support the optical film, such as the light guide plate 202, and serves as the appearance part directly presented to users. In order to avoid the integrally-formed frame 205 being scratched and beautify the integrally-formed frame 205, outer surfaces of side surfaces, a front surface and a back surface of the integrally-formed frame 205 (all surfaces except for a surface of the integrally-formed frame 205 facing and receiving the light guide plate 202) are subjected to a texturing process, and the outer surfaces of the integrally-formed frame 205 are provided with a pattern formed by the texturing process.

Optionally, a specification of the texturing is MT11020 (not limited to this).

The present disclosure further provides a display device including a display panel 207 and the backlight module as described above. As shown in FIGS. 2-13, the backlight module includes the integrally-formed frame 205, and the light guide plate 202 is arranged in the accommodating cavity of the integrally-formed frame 205. The optical film 201 is arranged on the light guide plate 202. A reflective sheet 203 is arranged between the light guide plate 202 and the bottom plate 2054. The light bar 204 is located on a side of the light guide plate 202. The top plate 2052 supports the display panel 207. A foam tape 206 (an adhesive layer may also be used here) is arranged between the top plate 2052 and the display panel 207 to fix the display panel 207.

The display device may be any product or component having a display function, such as a liquid crystal television, a liquid crystal display, a digital photo frame, a mobile phone, a tablet computer, etc., in which the display device further includes a flexible circuit board, a printed circuit board, and the back plate.

The backlight module and the display device of the present embodiment include an integrally-formed frame 205, which have the following outstanding advantages:

Advantage 1: Thin and light

Light: according to calculation, taking a 21.5 size as an example, a weight of the backlight module in the related art is approximate 2 KG, and a weight of the backboard is approximate 1 KG. In the case that the back plate is removed in the present embodiment, the weight of the backlight module can be reduced to 1 KG.

Thin: In the present embodiment, the integrally-formed frame 205 is used for receiving the optical film, such as the light guide plate 202, in the backlight module and the display module; the integrally-formed frame 205 directly serves as an appearance part of the display device, so that a middle case and/or a rear case of the display device in the related art can be omitted(some display devices are provided with a rear case outside the back plate); and a thickness of the display device can be reduced to 5.9 mm.

Advantage 2: no clamping structure

As shown in FIGS. 2 and 3, the backlight module of the present embodiment has no back plate compared with the backlight module in the related art (as shown in FIG. 1), and has no clamping structure, thereby preventing the backlight module from generating the debris during clamping, affecting the quality of the backlight module.

Advantage 3: Environmentally friendly and beautiful, reducing costs

In a design of the backlight module with integrated display appearance, the back plate is used as an appearance display member. In order to achieve an aesthetic effect, the back plate is painted. It is well known that a liquid coating process and a powder coating process are very harmful to the environment and the operators, and a piece of painted back plate costs ⅓ to ¼ of the price of the backlight module. In the present embodiments, the integrally-formed frame 205 is integrally formed, and the integrally-formed frame 205 is used as an appearance display member to avoid the back plate painting process, and o It only needs to add the texturing process on the basis of the one-piece frame 205 mold (the integrated frame 205 and the back plate adopt different materials, and the manufacturing process is naturally different, the back plate and painting are omitted, which is not only environmentally friendly, but also greatly reduces the cost of the backlight module.

The beneficial effects of the present disclosure are that a design of the integrally-formed frame greatly reduces the weight of the backlight module and the backlight module has no clamping structure, thereby reducing defect of the backlight module caused by the debris during clamping.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A backlight module comprising:
    a light guide plate, and
    an integrally-formed frame covering the light guide plate, wherein, the integrally-formed frame comprises an accommodating cavity for accommodating the light guide plate; the accommodating cavity is formed to be surrounded by a top plate located at a light-emitting surface of the light guide plate, a side plate located at a side of the light guide plate, and a bottom plate located at a bottom surface of the light guide plate opposite to the light-emitting surface,
    wherein the integrally-formed frame comprises a bendable section, at least one of the top plate, at least a portion of the side plate and at least a portion of the bottom plate is bendable about the bendable section to open and close the accommodating cavity.

2. The backlight module according to claim 1, wherein the bendable section is located at one place of a joint between the top plate and the side plate, the side plate and the bottom plate.

3. The backlight module according to claim 1, wherein the bendable section includes a separable portion adjacent to the light guide plate and an inseparable portion far away from the light guide plate, the separable portion and the inseparable portion are arranged in a direction along a thickness of the integrally-formed frame.

4. The backlight module according to claim 3, wherein the separable portion comprises a first sub-portion and a second sub-portion, the first sub-portion and the second sub-portion are formed to be divided by a separating line, the separating line is along a direction from a first position of a surface of the bendable section adjacent to the light guide plate to a surface of the bendable section facing away from the light guide plate.

5. The backlight module according to claim 4, wherein a protrusion extending toward the second sub-portion is arranged at a surface of the first sub-portion adjacent to the second sub-portion, a groove that cooperates with the protrusion is arranged at a surface of the second sub-portion adjacent to the first sub-portion.

6. The backlight module according to claim 5, wherein the protrusion has a T-shaped cross section, and the protrusion includes a first connecting portion adjacent to the second sub-portion and a second connecting portion far away from the second sub-portion, the first connecting portion has a trapezoid cross section, and an area of a surface of the first connecting portion adjacent to the second sub-portion is smaller than an area of a surface of the first connecting portion far away from the second sub-portion.

7. The backlight module according to claim 6, wherein a material of the integrally-formed frame comprises at least one of an ABS and a PC.

8. The backlight module according to claim 4, wherein a first snapping part is arranged on a surface of the first sub-portion facing away from the light guide plate, and a second snapping part for snapping to the first snapping part is arranged on a surface of the second sub-portion facing away from the light guide plate.

9. The backlight module according to claim 8, wherein the first snapping part is a columnar structure, and the second snapping part comprises a hook that is enabled to snap to the columnar structure.

10. The backlight module according to claim 1, wherein the integrally-formed frame is integrally injection molded.

11. The backlight module according to claim 1, wherein the integrally-formed frame is made of plastic, and a hardness value of the integrally-formed frame is within a first predetermined range so that the integrally-formed frame can support the light guide plate and the display panel.

12. The backlight module according to claim 1, wherein an outer surface of the integrally-formed frame is provided with a pattern formed by a texturing process.

13. A display device comprising a display panel and the backlight module according to claim 1.

14. The display device according to claim 13, wherein the bendable section is located at one place of a joint between the top plate and the side plate, the side plate, and the bottom plate.

15. The display device according to claim 13, wherein the bendable section includes a separable portion adjacent to the light guide plate and an inseparable portion far away from the light guide plate, the separable portion and the inseparable portion are arranged in a direction along a thickness of the integrally-formed frame.

16. The display device according to claim 15, wherein the separable portion comprises a first sub-portion and a second sub-portion, the first sub-portion and the second sub-portion are formed to be divided by a separating line, the separating line is along a direction from a first position of a surface of the bendable section adjacent to the light guide plate to a surface of the bendable section facing away from the light guide plate.

17. The display device according to claim 16, wherein a protrusion extending toward the second sub-portion is arranged on a surface of the first sub-portion adjacent to the second sub-portion, a groove that cooperates with the protrusion is arranged on a surface of the second sub-portion adjacent to the first sub-portion; and the protrusion has a T-shaped cross section, and the protrusion includes a first connecting portion adjacent to the second sub-portion and a second connecting portion far away from the second sub-portion, the first connecting portion has a trapezoid cross section, and an area of a surface of the first connecting portion adjacent to the second sub-portion is smaller than an area of a surface of the first connecting portion far away from the second sub-portion.

18. The display device according to claim 16, wherein a first snapping part is arranged on a side of the first sub-portion facing away from the light guide plate, and a second snapping part for snapping to the first snapping part is arranged on a surface of the second sub-portion facing away from the light guide plate; and the first snapping part is a columnar structure, and the second snapping part comprises a hook that is enabled to snap to the columnar structure.

\* \* \* \* \*